(12) United States Patent
Arvidsson et al.

(10) Patent No.: US 9,572,025 B2
(45) Date of Patent: Feb. 14, 2017

(54) METHOD, SERVER, COMPUTER PROGRAM AND COMPUTER PROGRAM PRODUCT FOR COMMUNICATING WITH SECURE ELEMENT

(75) Inventors: Petter Arvidsson, Bromma (SE); Mattias Eld, Spånga (SE); Sébastien Pierrel, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 531 days.

(21) Appl. No.: 13/264,226

(22) PCT Filed: May 8, 2009

(86) PCT No.: PCT/SE2009/050511
§ 371 (c)(1),
(2), (4) Date: Oct. 13, 2011

(87) PCT Pub. No.: WO2010/120222
PCT Pub. Date: Oct. 21, 2010

(65) Prior Publication Data
US 2012/0047237 A1 Feb. 23, 2012

Related U.S. Application Data

(60) Provisional application No. 61/169,864, filed on Apr. 16, 2009.

(51) Int. Cl.
*G06F 15/16* (2006.01)
*H04M 1/66* (2006.01)
(Continued)

(52) U.S. Cl.
CPC ............ *H04W 12/02* (2013.01); *G06Q 20/32* (2013.01); *G06Q 20/3227* (2013.01); *G06Q 20/425* (2013.01); *H04W 12/10* (2013.01)

(58) Field of Classification Search
CPC ... G07F 7/1008; H04L 63/0853; H04W 12/02; H04W 12/10; G06Q 20/32; G06Q 20/3227; G06Q 20/425
(Continued)

(56) References Cited

U.S. PATENT DOCUMENTS 8,250,662 B1 * 8/2012 Zhu .................................. 726/26
8,510,773 B1 * 8/2013 Abou-Rizk ........ G06Q 30/0261
725/32

(Continued)

FOREIGN PATENT DOCUMENTS

EP       2043060 A1     4/2009
JP    2006209718 A      8/2006
(Continued)

OTHER PUBLICATIONS

Nordlund, S. "From NFC Pilots Towards Commercial Roll-Outs—Status Update and Ecosystem Requirements." NFC Congress, Hagenberg, Austria, Feb. 27, 2008.
(Continued)

*Primary Examiner* — Philip Chea
*Assistant Examiner* — Wing Ma
(74) *Attorney, Agent, or Firm* — Patent Portfolio Builders, PLLC

(57) ABSTRACT

A method is presented for sending a message to a secure element connected to a mobile equipment, wherein the secure element is coupled to a user of the mobile equipment. The method comprises the steps, performed in an application manager server of: receiving, from an application server, an application message and an identifier of a destination secure element; generating a secure element message from the application message; from a plurality of connectivity providers, selecting a connectivity provider capable of communicating with the destination secure element; and
(Continued)

sending the secure element message to the selected connectivity provider for forwarding to the destination secure element. A corresponding application manager server, computer program and computer program product are also presented.

12 Claims, 7 Drawing Sheets

(51) Int. Cl.
  *H04W 12/02* (2009.01)
  *G06Q 20/32* (2012.01)
  *G06Q 20/42* (2012.01)
  *H04W 12/10* (2009.01)

(58) Field of Classification Search
  USPC .................................. 709/219; 455/411, 410
  See application file for complete search history.

(56) References Cited

U.S. PATENT DOCUMENTS

| | | | | |
|---|---|---|---|---|
| 8,559,987 B1* | 10/2013 | Fisher | ............................ | 455/466 |
| 8,578,153 B2* | 11/2013 | Johansson | ................. | H04L 9/12 |
| | | | | 713/158 |
| 8,655,310 B1* | 2/2014 | Katzer | .............. | H04M 1/72519 |
| | | | | 455/410 |
| 8,671,438 B2* | 3/2014 | Parker | ................... | G06F 21/554 |
| | | | | 370/357 |
| 8,689,012 B1* | 4/2014 | Bierbaum | ............... | G06F 11/30 |
| | | | | 705/64 |
| 8,768,845 B1* | 7/2014 | Persson | ................... | G06F 21/57 |
| | | | | 235/379 |
| 2004/0008656 A1 | 1/2004 | Qu et al. | | |
| 2004/0117618 A1* | 6/2004 | Kawaguchi et al. | ......... | 713/156 |
| 2006/0039564 A1* | 2/2006 | Rao | ....................... | G06F 21/572 |
| | | | | 380/270 |
| 2006/0059344 A1* | 3/2006 | Mononen | .............. | H04L 63/061 |
| | | | | 713/171 |
| 2006/0085848 A1* | 4/2006 | Aissi et al. | ........................ | 726/9 |
| 2006/0115084 A1* | 6/2006 | Ryu | ....................... | H04H 60/16 |
| | | | | 380/247 |
| 2007/0186115 A1* | 8/2007 | Gao | ...................... | H04W 12/06 |
| | | | | 713/184 |
| 2009/0193491 A1* | 7/2009 | Rao | ................... | 726/1 |
| 2009/0209232 A1* | 8/2009 | Cha | ..................... | H04L 63/0428 |
| | | | | 455/411 |
| 2009/0247078 A1* | 10/2009 | Sklovsky et al. | ............ | 455/41.1 |
| 2009/0305673 A1* | 12/2009 | Mardikar | ....................... | 455/411 |
| 2010/0050271 A1* | 2/2010 | Saarisalo | ........................ | 726/28 |
| 2010/0062808 A1* | 3/2010 | Cha et al. | ..................... | 455/558 |
| 2010/0138518 A1* | 6/2010 | Aiglstorfer et al. | .......... | 709/219 |
| 2010/0205432 A1* | 8/2010 | Corda et al. | .................. | 713/159 |
| 2010/0291896 A1* | 11/2010 | Corda | .......................... | 455/410 |
| 2011/0029671 A1* | 2/2011 | Deprun et al. | ................ | 709/225 |
| 2011/0183611 A1* | 7/2011 | Wane | ..................... | G06Q 20/32 |
| | | | | 455/41.1 |
| 2011/0213842 A1 | 9/2011 | Takenouchi et al. | | |
| 2011/0239304 A1* | 9/2011 | Saarisalo | ........................ | 726/26 |
| 2011/0250866 A1* | 10/2011 | Fisher | .................... | G06Q 20/20 |
| | | | | 455/410 |
| 2011/0252140 A1* | 10/2011 | Seif | ..................... | H04L 63/0428 |
| | | | | 709/226 |
| 2012/0089520 A1* | 4/2012 | Mardikar | ......................... | 705/71 |
| 2012/0130838 A1* | 5/2012 | Koh | ..................... | G06Q 20/352 |
| | | | | 705/26.1 |
| 2012/0149338 A1* | 6/2012 | Roundtree | .................... | 455/411 |
| 2013/0198086 A1* | 8/2013 | Mardikar | ........... | G06Q 20/1085 |
| | | | | 705/71 |

FOREIGN PATENT DOCUMENTS

| | | |
|---|---|---|
| JP | 2007318768 A | 12/2007 |
| WO | 2009013702 A2 | 1/2009 |
| WO | 2009/016540 A2 | 2/2009 |
| WO | 2009016540 A2 | 2/2009 |
| WO | 2009022568 A1 | 2/2009 |

OTHER PUBLICATIONS

Author Unknown. "Mobile NFC Technical Guidelines." Version 2.0, GSM Association, Nov. 2007.

Paul, J., "Business-Creating Technology", Mobile Platform, Nikkei Communications, Jan. 15, 2009, p. 59, Nikkei Business Publications, Issue No. 526.

Office Action in JP application No. 2012-505852 issued Sep. 24, 2013. English Translation Submitted.

* cited by examiner

METHOD, SERVER, COMPUTER PROGRAM AND COMPUTER PROGRAM PRODUCT FOR COMMUNICATING WITH SECURE ELEMENT

FIELD OF INVENTION

The present invention relates generally to communication with one or more secure elements.

BACKGROUND

Near Field Communication (NFC) is a technology enabling many different kinds of useful services. In particular value based services have been discussed, such as payment, ticketing, physical access and coupons. In this type of services, there is a natural desire to implement the applications in a secure way.

One solution to securely implement an NFC application is to install the application on a secure element. An example of such a secure element could be the UICC (Universal Integrated Circuit Card) of a mobile equipment, but also other choices are possible such as a secure element embedded within the mobile equipment or a secure element in the form of a secure digital card.

The secure element is normally not managed by the end-user himself, but by some entity with which the end-user has a billing relationship (operator) or other relationship (terminal manufacturer).

It has been proposed that there is a need for a brokering entity between service providers utilizing the secure element and the entities managing the secure elements. This brokering entity is referred to as a Trusted Service Manager (TSM).

Today applications are loaded onto the SE at manufacturing time (this is the common way of managing SIMs (Subscriber Identity Module) and Eurocard-Mastercard-VISA (EMV) application. Some SEs however utilizes the Global Platform card management system. These SEs are referred to as multi application SEs. The Global Platform (GP) card management system is not dependent on any specific connection protocol to the SE, but is mostly used during manufacturing time. However, with the advent of mobile phones other means have surfaced, and it has recently been described how to use GP in conjunction with the SIM application toolkit. However, this leads to a system where the TSM needs to be a very complex entity that handles the various different types of low level communication and the different types of application logic.

The resulting TSM lacks much of the flexibility needed to adapt the TSM for the brokering role.

SUMMARY

An object of the invention is to simplify the communication between an application server and a secure element.

According to a first aspect of the invention, a method is presented for sending a message to a secure element connected to a mobile equipment, wherein the secure element is coupled to a user of the mobile equipment. The method comprises the steps, performed in an application manager server, of: receiving, from an application server, an application message and an identifier of a destination secure element; generating a secure element message from the application message; from a plurality of connectivity providers, selecting a connectivity provider capable of communicating with the destination secure element; and sending the secure element message to the selected connectivity provider for forwarding to the destination secure element.

This decouples the application manager server from the communication with the mobile equipment and secure element, allowing new opportunities. The application manager server can thus act on behalf of the application server and select an appropriate connectivity provider which is appropriate to allow communication with the destination secure element. Each connectivity provider can thus in turn specialise to the extent that is necessary to allow communication with the secure element. All connectivity providers can optionally have the same interface with the application manager server.

The method may further comprise the steps of: receiving, from the selected connectivity provider, an acknowledgement that the destination secure element has received the secure element message; and sending, to the application server, an acknowledgement that the destination secure element has received the secure element message.

This is one aspect of real-time communication between the application server and the secure element, which is a significant improvement of the prior art.

The step of generating a secure element message may comprise using the application message as a secure element message. In other words, the message is optionally not converted when going from application message to secure element message.

The method may further comprise the step of: setting up a secure channel to the secure element; and wherein the step of sending the secure element message for forwarding to the destination secure element comprises sending the secure element message over the secure channel. Such a secure channel allows, when the application server trusts the application manager server, a secure communication between the application manager server and the secure element, whereby the application server does not need to manage the secure communication with the secure element.

The method may further comprise the steps, prior to the step of sending a secure element message, of: sending, to a secure element manager server, the secure element message; receiving, from the secure element manager server, a signature of the secure element message; and wherein the sending a secure element message to the connectivity provider includes sending the signature. This allows the secure element manager server to retain full control over what messages are signed in communication with the secure element. Optionally, encryption can work in the same way.

The signature may be appended to the message to be signed.

The method may further comprise the step, prior to the step of sending the secure element message to a secure element manager server, of: from a plurality of secure element manager servers, selecting a secure element manager server which is coupled to the destination secure element, and wherein the step of sending the secure element message to a secure element manager server comprises sending the secure element message to the selected secure element manager server. In other words, the application manager server selects a secure element manager server which corresponds to the destination secure element.

Several secure element messages to be signed may be sent collectively and corresponding signatures may be received collectively. This allows for more efficient communication between the application manager server and the secure element manager server.

A second aspect of the invention is an application manager server for sending messages to a secure element connected to a mobile equipment, wherein the secure element is coupled to a user of the mobile equipment. The application manager server comprises: a receiver configured to receive, from an application server, an application message and an identifier of a destination secure element; a controller configured to generate a secure element message from the application message; a connection selector configured to select, from a plurality of connectivity providers, a connectivity provider capable of communicating with the destination secure element; and a sender configured to send the secure element message to the selected connectivity provider for forwarding to the destination secure element.

The connection selector may be configured to select a second application manager server, wherein the second application manager server is capable of communicating with the destination secure element.

The application manager server can further be configured to receive, from a selected connectivity provider, an acknowledgement that the destination secure element has received the secure element message; and to send, to the application server, an acknowledgement that the destination secure element has received the secure element message.

The application message can be used as a secure element message.

The application manager server can further be configured to set up a secure channel to the secure element and to send the secure element message over the secure channel.

The application manager server may comprise a secure element manager interface configured to send, to a secure element manager server, the secure element message; and receive, from the secure element manager server, a signature of the secure element message. The sender is then configured to sending the signature to the selected connectivity provider. The signature can be appended to the message to be signed.

The application manager server may comprise a secure element manager server selector configured to select, from a plurality of secure element manager servers, a secure element manager server which is coupled to the destination secure element.

Several secure element messages to be signed can be sent collectively and corresponding signatures can be received collectively.

A third aspect of the invention is a computer program for sending a message to a secure element connected to a mobile equipment, wherein the secure element is coupled to a user of the mobile equipment. The computer program comprises computer program code which, when run on an application manager server, causes the server to: receive, from an application server, an application message and an identifier of a destination secure element; generate a secure element message from the application message; from a plurality of connectivity providers, select a connectivity provider capable of communicating with the destination secure element; and send the secure element message to the selected connectivity provider for forwarding to the destination secure element.

The computer program may further comprise computer program code to: receive, from the selected connectivity provider, an acknowledgement that the destination secure element has received the secure element message; and send, to the application server, an acknowledgement that the destination secure element has received the secure element message.

The computer program code may further comprise code to use the application message as a secure element message.

The computer program may further comprise computer program code to: set up a secure channel to the secure element; and wherein the computer program code to send the secure element for forwarding to the destination secure element comprises computer program code to send the secure element over the secure channel.

The computer program may further comprise computer program code to: send, to a secure element manager server, the secure element message; receive, from the secure element manager server, a signature of the secure element message; and wherein the computer program code to send a secure element message to the connectivity provider includes computer program code to send the signature.

The computer program may further comprise computer program code to: from a plurality of secure element manager servers, select a secure element manager server which is coupled to the destination secure element, and wherein the computer program code to send the secure element message to a secure element manager server comprises computer program code to send the secure element message to the selected secure element manager server.

Several secure element messages to be signed may be sent collectively and corresponding signatures may be received collectively.

A fourth aspect of the invention is a computer program product comprising a computer program according to the third aspect and a computer readable means on which the computer program is stored.

It is to be noted that any feature of the first, second, third and fourth aspects may, where appropriate, be applied to any other aspects.

Whenever the word 'plurality' is used in the description and claims, it is to be construed as meaning 'more than one'.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Existing solutions using a Trusted Service Manager have tight coupling between the TSM and the actual communication channel that is used to communicate with the secure element, e.g. an OTA (over the air) server. They also have a tight coupling between the TSM and the application logic that is used. This leads to a system where the TSM needs to be a very complex entity that handles all different types of low level communication and all different types of application logic. It also inhibits a trust model where there is an end to end trust relationship between the service provider and the service provider's application on the secure element. Instead, service providers are forced to trust the TSM as it provides the security.

There is also no inclusion of a secure element manager which can, on behalf of the service provider, sign commands sent between the TSM and the secure element, if required by the secure element. This can for example be required if the application manager wants to perform management commands (e.g. for installation of a new application or a removal of an application on the secure element), but does not have authorised management rights.

The lack of these capabilities leads to a system which lacks much of the flexibility needed to adapt the TSM for the brokering role.

Figure 1:
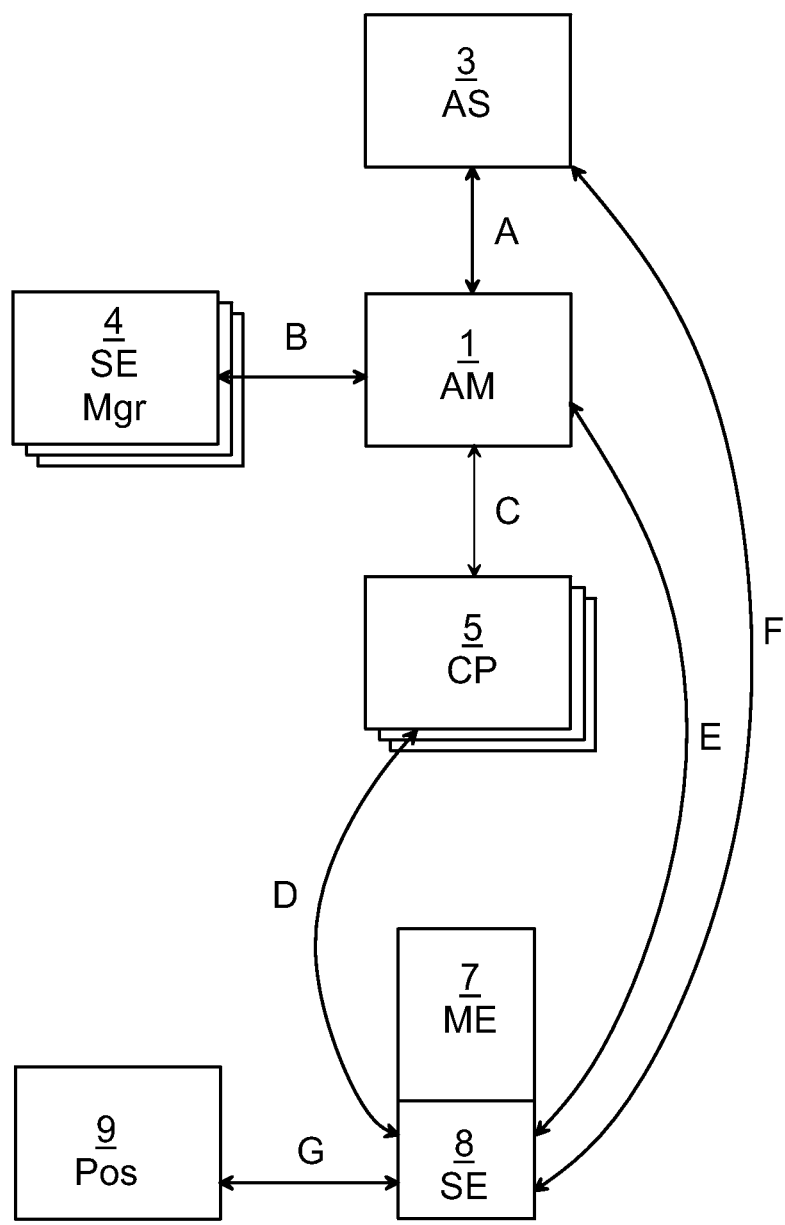
FIG. 1 is a schematic diagram illustrating an environment in which embodiments of the present invention can be applied.

Here now follows a description with reference to the system illustrated in FIG. 1. The system here consists of seven interfaces A-G and seven functional blocks 1, 3-5, 7-9. Here now follows a description of the functional blocks.

An application server 3 is responsible for application specific logic and for the end-user management. An end user can interface with the application server separately, e.g. from a browser application of a mobile equipment 7, a browser of an external computer or through specific software interfacing with the application server 3. The application server 3 can for example be under the responsibility of a service provider, e.g. a bank, a transport operator, an event ticket provider, a coupon issuing service, etc.

An application manager server 1 is a server which is responsible for installing and management of the application on a secure element 8. The application manager server 1 therefore interacts with the secure element manager to get management tokens (for operations which require authorisation from the secure element manager), with the secure element connectivity provider to set up a link to the secure element, and with the secure element itself for performing the actual application management. The application manager server 1 also interacts with the application server 3 to know when and where to install certain applications or which application or security domain the application server 3 wants to communicate with. The application manager server 1 simplifies the interfaces for the application server 3, whereby the application server 3 can connect to the application manager server 1 for any communication (real-time or not) with any secure element within the scope of the application manager server 1.

A secure element connectivity provider 5 is a server responsible for setting up a link to the secure element. The secure element connectivity provider 5 could be a SIM OTA, OMA DM server or any other entity capable of communicating with a secure element.

A secure element manager 4 is a server having a secure domain with Authorised Management rights on the secure element. The application manager server 1 interacts with the secure element manager 4 to create management tokens.

A mobile equipment 7. The mobile equipment 7 interacts with secure element connectivity provider 5 to set up a link between the application manager server 1 and the secure element. The mobile equipment 7 could for example be a mobile (cellular) phone.

The secure element 8 houses the application issued by the application server 3 and interacts with the application manager server 1 to manage the applications.

There are seven interfaces that can be seen in FIG. 1, which will now be presented.

Interface A allows the application server 3 to interact with the application manager server 1 to perform the following tasks:
 upload an application destined for a Secure Element to the application manager server 1.
 load, de/install, or personalise applications onto a secure element 8 belonging to a specific identity (either application specific alias or tied to an MSISDN) using global platform based Secure Channel Protocols.
 have real time communication with an installed application or security domain on the secure element 8.
 create/delete Security Domains.
 request information about if a specific element or entity (identified as above) can carry a specific application due to space etc.

Interface B allows the application manager server 1 to interact with the secure element manager 4 to send APDUs (application protocol data units) to be signed with the private key of the secure element manager 4.

Interface C allows the application manager server 1 to set up WAN link to the secure element 8 to have real time communication with a secure element.

Interface D is used by the secure element connectivity provider 5 to set up a link to the secure element. This interface can be based on SIM OTA, OMA DM, HTTPS or any other protocol capable of transporting APDUs in any format.

Interface E is used by the application manager server 1 to interact with the secure element 8 and can be based on global platform specifications.

Interface F is used by the application server 3 to interact with the secure element 8 and can for example use APDUs.

Interface G is the interface between the secure element 8 and a point of sale (PoS) terminal 9, as is known in the art per se. APDUs can be utilised to enable communication over this interface.

Much of the benefit of the application manager server 1 comes from the fact that, in general, a complete system contains multiple secure element connectivity providers 5 and multiple secure element managers 4. This fact is hidden from the application server 3 by the application manager server 1.

Figure 2:
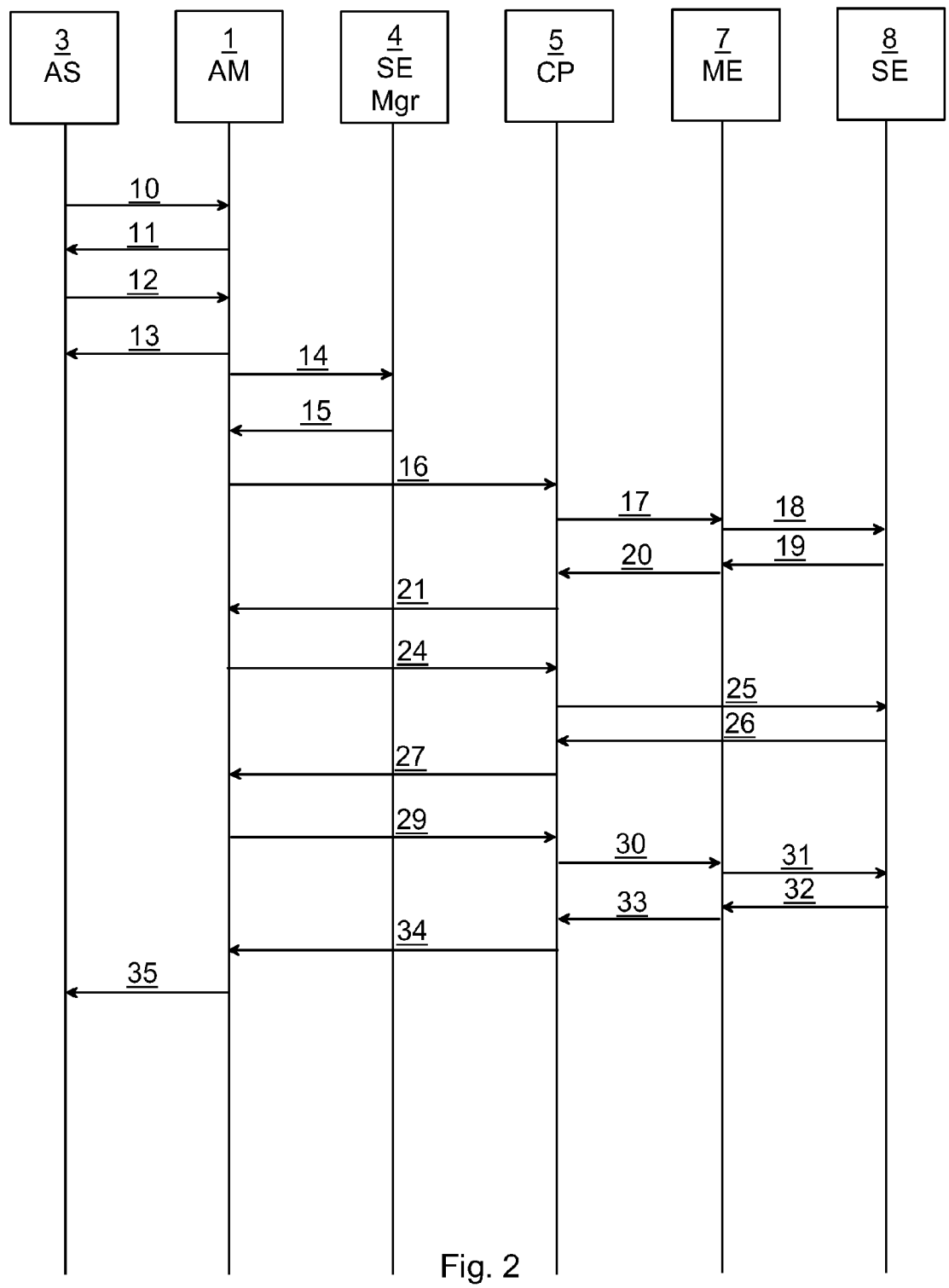
FIG. 2 is a sequence diagram illustrating communication between entities of FIG. 1 for installation of an application on the secure element.

FIG. 2 is a sequence diagram showing how to first upload an application to the application manager server 1, and then how to install this application to a secure element 8, using the elements of FIGS. 1 and 2.

First, there is an interaction only between the application server 3 and the application manager server 1. The application server 3 asks 10 the application manager server 1 to store an application, whereby the application manager responds 11 with a confirmation message when the application is stored in the application manager server 1. This sequence is performed once, and then the application manager server 1 can reuse this application for many different secure elements 8. It can even be so that the application manager server 1 reuses this application for other application servers 3 than the one that uploaded it.

Subsequently, the application server 3 asks 12 the application manager server 1 to install this application to a specific end-user, whereby the application manager server 1 responds 13 with an acknowledgement. The application manager server 1 can now select among multiple secure elements available in the end-user device. After having selected one, it contacts 14 the secure element manager 4 of that secure element 8 (for instance the operator or the terminal manufacturer corresponding to the secure element 8) to get LOAD and INSTALL commands signed according to the global platform specification. After having received 15 these commands signed, the application manager server 1 opens up a channel to the secure element 8 by communicating 16 with the secure element connectivity provider 5. The secure element connectivity provider 5 then opens up a channel to the secure element 8 by requesting 7 this to the mobile equipment which in turn opens 18 a channel with the secure element 8. The secure element confirms 19 the open channel to the mobile equipment 7, which in turn confirms 20 to the connectivity provider 5, which finally confirms 21 the open channel to the application manager 1. Through this channel, a global platform standardised secure channel can first be set up, and then the actual LOAD and INSTALL commands are sent. The commands are sent 29 from the application manager 1 to the connectivity provider 5 which forwards 30 the command to the mobile equipment 7 for further forwarding 31 to the secure element. The command is acknowledged 32, 33, 34 from the secure element 8 to the mobile equipment 7 to the application manager 1. Any number of commands can be sent, repeating communication 29-34 as necessary. When everything is ready, an acknowledgement is sent 35 to the application server 3.

Figure 3:
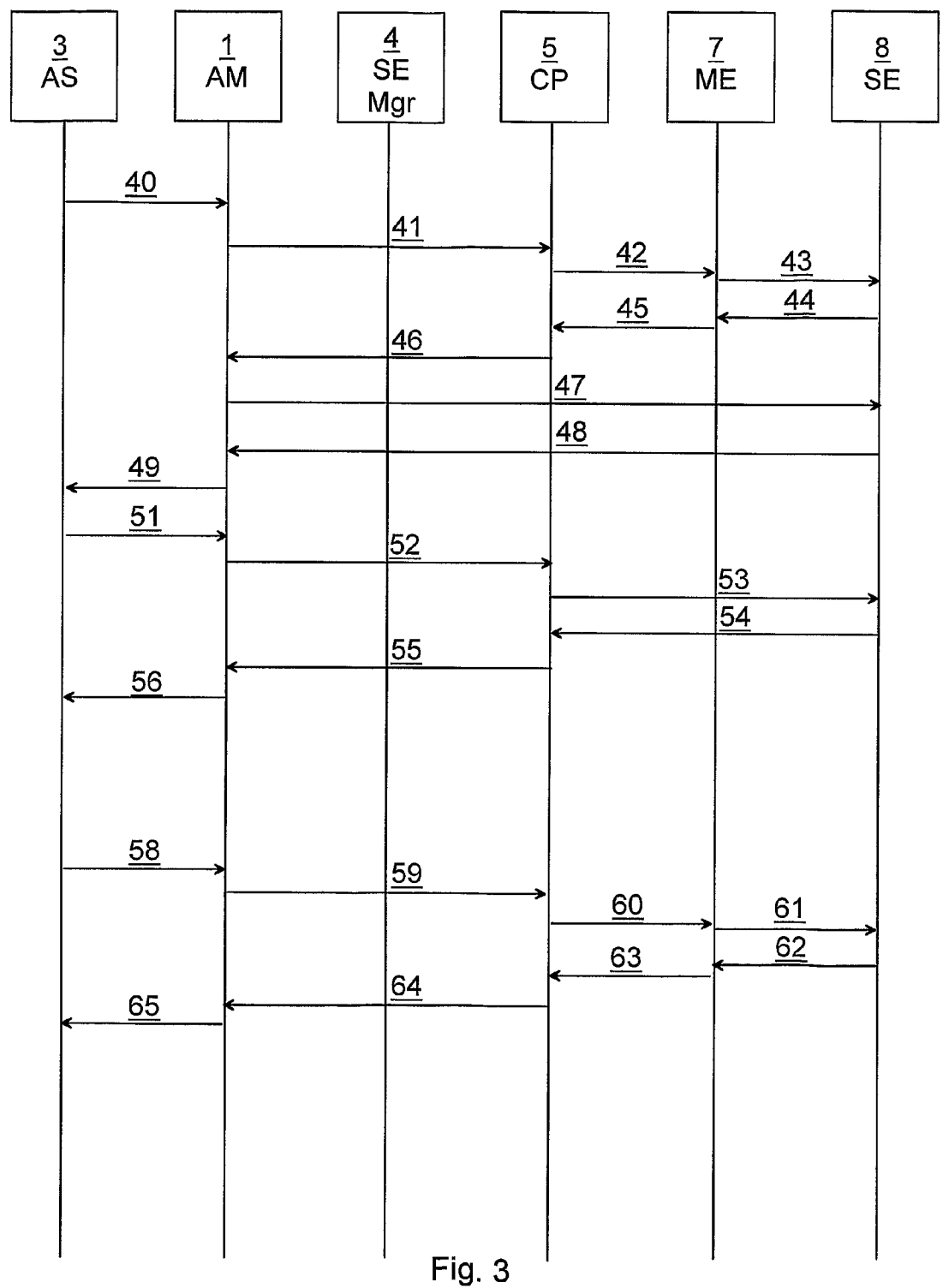
FIG. 3 is a sequence diagram illustrating communication between entities of FIG. 1 for real-time communication between the application server and the secure element.

FIG. 3 is a sequence diagram showing how an application server 3 can perform real time communication with the installed application, using the elements of FIG. 1.

When the application server 3 wants to exchange real time data with its installed application (or security domain), the application server 3 requests 40 the application manager server 1 to open a channel to the specific application (or security domain). The application manager server 1 opens up a channel to the secure element 8 by communicating 41 with the secure element connectivity provider 5. The secure element connectivity provider 5 then opens up a channel to the secure element 8 by requesting 42 this to the mobile equipment 7 which in turn opens 43 a channel with the secure element 8. The secure element confirms 44 the open channel to the mobile equipment 7, which in turn confirms 45 to the connectivity provider 5, which finally confirms 46 the open channel to the application manager 1. If the application manager server 1 is successful in opening the channel it can thereafter be used by the application server 3 to directly transfer APDUs to the application or security domain via the application manager server 1 and the secure element connectivity provider 5. This is performed by APDU forwarding 51, 52, 53 from the application server 3 to the application manager server 1, via the connectivity provider 5 to the secure element 8. Response APDUs are sent 54, 55, 56 in reverse order from the secure element 8 via the connectivity provider 5 and the application manager server 7 to the application server 3. Multiple APDUs can be transferred as desired by the application server 3, whereby the communication 51-56 is repeated.

When the application server 3 is finished with the communication it indicates this by requesting 58 the application manager server 1 to close the channel. In a similar way to when the channel was opened, the application manager server 1 closes the channel using communication 59-61 via the connectivity provider 5 and the mobile equipment 7. Acknowledgments of the closed channel is sent in reverse order from the secure element 7 via the connectivity provider 5 and the application manager server 1 to the application server 3.

The channel in this example may transport unaltered APDUs or APDUs encrypted and/or signed using any Secure Channel Protocol. In this case there might be a need to involve the secure element manager 4. This is not shown FIG. 4, but can be achieved in the same way as shown in FIG. 2. In other words, any commands that need to be encrypted are sent from the application manager server 1 to the secure element manager 4 for signature or encryption.

Figure 4:
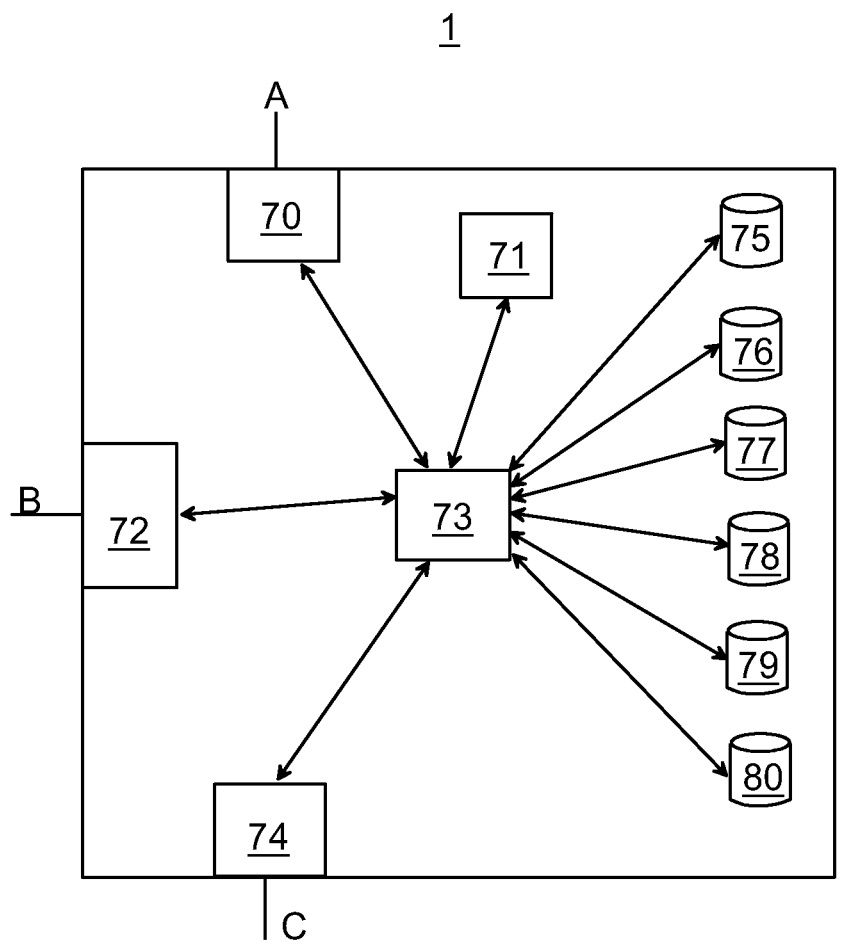
FIG. 4 is a schematic diagram illustrating internal modules of the application manager of FIG. 1.

FIG. 4 illustrates the internals of the application manager server 1 of FIGS. 1 and 2. The application manager server 1 contains a set of databases 75-80 to handle the relations with different elements. In particular, there is storage 75 for keeping track of application servers 3, storage 76 for keeping track of applications, storage 77 for keeping track of secure elements 8, storage 78 for keeping track of end users, storage 79 for keeping track of secure element managers 4, and storage 75 for keeping track of 80 secure element connectivity providers 5. Additionally, the application manager server 1 contains a number of engines to execute different tasks. There are an engines 70, 72, 74 to control the communication over different interfaces, such as an interface A engine 70, an interface B engine 72 and an interface C engine 74. Furthermore, there is a central engine 73 that binds these elements together. There is also an engine 71 to implement the global platform protocol and to create APDUs.

In general, the flow is that the application manager server 1 opens up a channel to the secure element 8, and then depending on whether or not the APDUs that should go over this channel should be signed by the secure element manager 4 or not, transfer the APDUs to the secure element manager 4 for signing and transfer the signed APDUs over the newly opened channel, or alternatively just transfer the unsigned APDUs over the channel.

Figure 5:
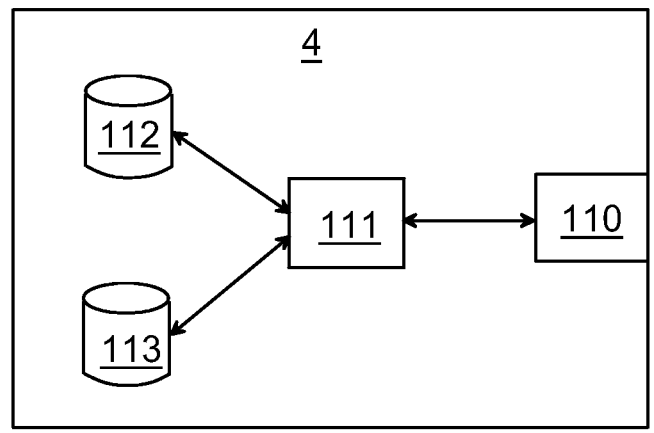
FIG. 5 is a schematic diagram illustrating internal modules of the secure element manager 4 of FIG. 1.

FIG. 5 shows components of the secure element manager 4 node of FIGS. 1 and 2. The secure element manager 4 contains storage 112 for accounting purposes (optional) and a key storage 113 to create tokens. It also contains an interface B engine 110 over which it can communicate with the application manager server 1 and a signing engine 111.

The main purpose of the secure element manager node 4 is to sign management commands from the application manager server 1 before the commands are put in the secure channel towards the card. This assumes that the secure element manager 4 has a secure domain on the card that has an authorised management privilege and a token verification privilege. For the following commands tokens are required for the application manager server 1 if it only has the delegated management privilege:

Loading;
Installation and make selectable;
Extradition;
Update to a global platform registry;
Deletion.

The token generation is performed on a per package basis.

Figure 6:
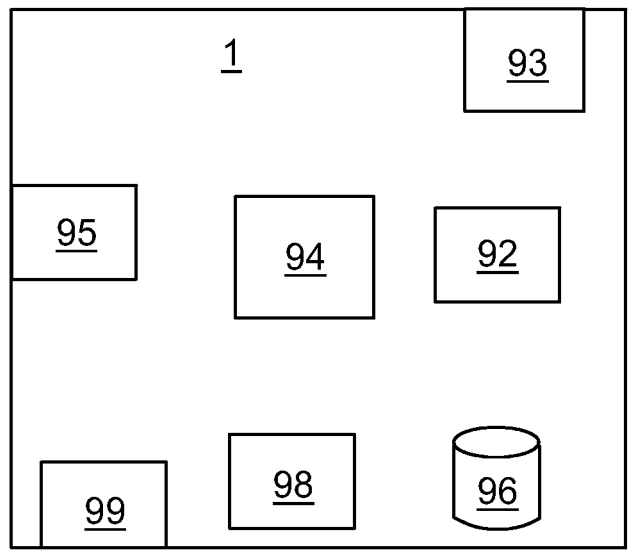
FIG. 6 is a schematic diagram illustrating internal modules of the application manager of FIG. 1 from another perspective.

FIG. 6 shows modules in another perspective of the application manager server 1 of FIG. 1. The modules 93, 94, 96, 98, 88 can be implemented using software and/or hardware. It is also to be noted that the modules may share some hardware components such as controllers and memory. The application manager server 1 is a server which is configured to act on appropriate messages sent to it.

The application manager server 1 comprises a receiver 93 configured to receive, from an application server 3, an application message and an identifier of a destination secure element 8 over interface A. The receiver 93 uses interface A and corresponds to the interface A engine of FIG. 4. The receiver can also comprise a sender, to achieve two-way communication over interface A.

A controller 94 is configured to generate a secure element message from the application message. The controller can for example be a central processing unit (CPU) of the server.

A connection selector 98 configured to select, from a plurality of connectivity providers, a connectivity provider capable of communicating with the destination secure element 8. If a second application manager server 1 is capable of communicating with the destination secure element 8, the connection selector 8 can select this second application manager server 1.

A sender 99 configured to send the secure element message to the selected connectivity provider for forwarding to the destination secure element 8. The sender 99 uses interface C, and corresponds to the interface C engine 74 of FIG. 4. The sender can also comprise an interface C receiver, to achieve two way communication over interface C.

A secure element manager interface 95 (also see FIG. 4) comprises elements configured to: send, to a secure element manager server, the secure element message; and receive, from the secure element manager server, a signature of the secure element message. The secure element manager interface 95 corresponds to the interface B engine 72 of FIG. 4.

A secure element manager server selector 92 is configured to select, from a plurality of secure element manager servers, a secure element manager server which is coupled to the destination secure element. The selected secure element manager server is used for in the communication using the secure element manager interface 72.

A computer program product, here in the form of a memory 96 is provided and is primary memory, such a RAM and has access and/or persistent storage, such as magnetic storage, solid state storage, optical storage or any combination of these. The memory 96 can contain a computer program that comprises software code that, when executed on the application manager server 1, makes the application manager server 1 perform the method described in with reference to FIG. 7 below.

Figure 7:
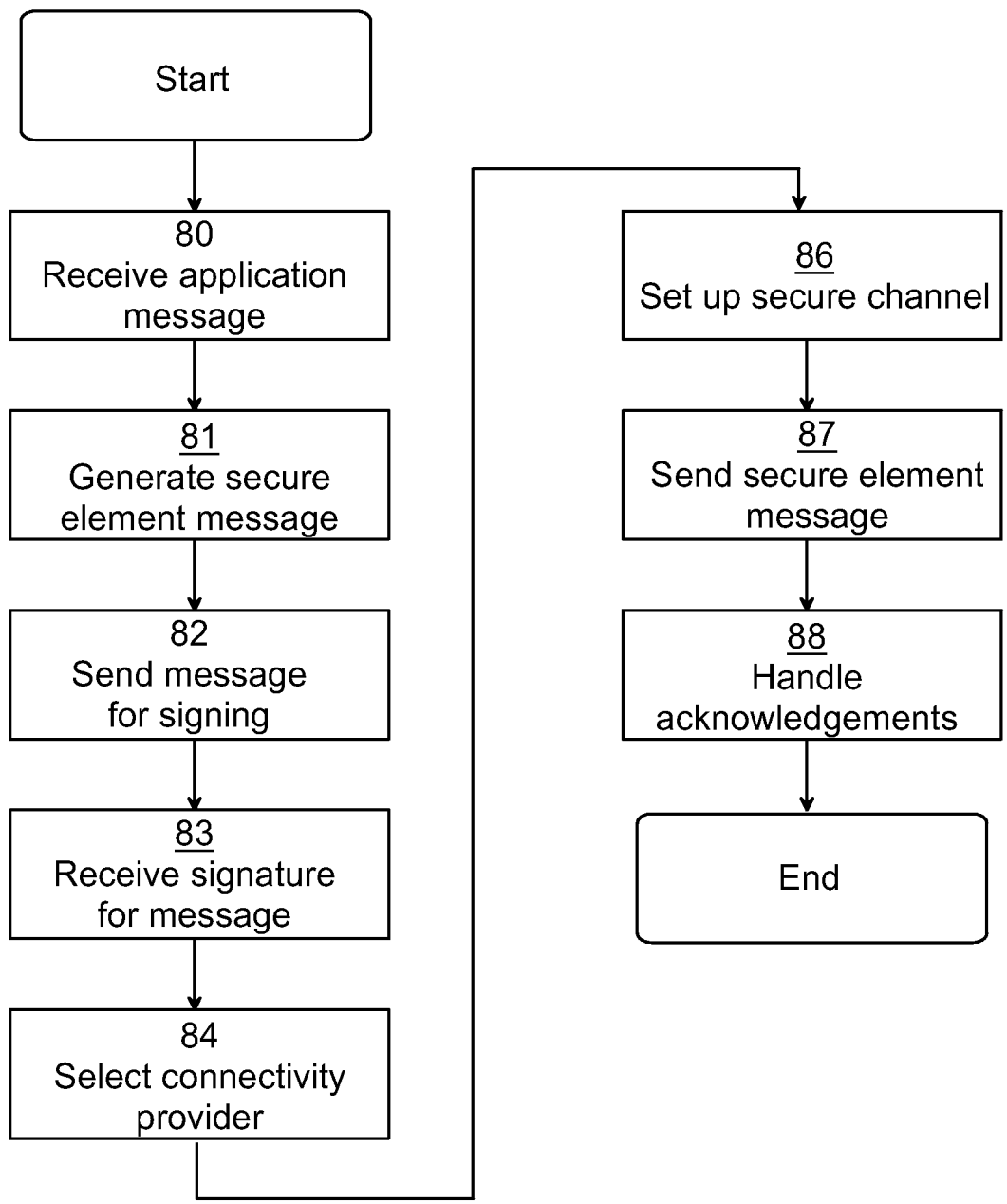
FIG. 7 is a flow chart illustrating a method performed in the application manager of FIG. 1.

FIG. 7 is a flow chart illustrating a method according to the present invention. The method is executed in the application manager server 1 of FIG. 1, in conjunction with other elements of FIG. 1.

In an initial receive application message step 80, an application message is received from an application server 3. The application message contains an identifier of where to send the contents of application message, either as part of the application message or separately. This identifier can for example be an MSISDN number (i.e. a phone number) and optionally an application identifier of an application stored in the secure element 8 of the mobile equipment 7 coupled to the MSISDN number.

In a step 81 to generate a secure element message from the application message, a secure element message is generated. This can be as simple as just forwarding the application message or providing encapsulation of the application message.

In the optional step 82 to send secure element message for signing, the secure element message is sent to the secure element manager server 4 for signing. This can for example be necessary to perform authorised operations in the secure element 8, such as application installation, application removal etc, which are may be under control of the secure element manager 4, which can thereby retain control of certain operations on the secure element 8. Optionally, a collection of secure element messages are sent for signing for efficiency. Optionally, a secure element manager 4 is selected in dependence of the destination secure element 8. For example, if the destination secure element 8 belongs to operator A, a secure element manager 4 belonging to operator A is selected in this step. Typically, the application manager server 1 has a plurality of secure element managers 4 to choose from, e.g. belonging to a plurality of operators, each with a set of secure element 8 under their control.

If step 82 is performed, a step 83 is performed to receive a signature for the secure element message. The signature can be appended to the secure element message or it can be sent on its own. If a collection of secure element messages are sent in step 82, a collection of signatures (appended to the original secure element message or on its own) are received in this step.

In a step 84 to select a connectivity provider, a connectivity provider is selected that is capable of communicating with the destination secure element 8. For example, a connectivity provider can be the mobile network operator of a home network of the mobile equipment 7. The application manager server 1 has a plurality of connectivity providers to choose from when selecting an appropriate connectivity provider. Hence this complexity is shielded from the application server 3, which can simply send an application message to the application manager server 1 and let the application manager server 1 be responsible for selecting and communicating with the appropriate connectivity provider.

In an optional step 86 to set up a secure channel, a secure channel is set up to the secure element 8. This can be used if the application server 3 delegates the secure communication with the secure element 8 to the application server 3. Alternatively, if the application server 3 itself manages the secure connection, this step is typically omitted, since end-to-end security between the application server 3 and the application on the secure element 8 is maintained without the help from the application server 3. In this step 86, a secure domain is selected and necessary security mechanisms, such as encryption keys, are used to communicate securely with a secure domain, and thereby any applications of that domain, on the secure element 8.

In a step 87 to send secure element message, the secure element 8 is sent to the selected connectivity provider for forwarding to the destination secure element 8. Of course, if signatures have been obtained, these are also sent via the selected connectivity provider to the secure element 8. If a secure channel has previously been set up, this secure channel is used in the sending, explicitly or implicitly.

In an optional step 88 to handle acknowledgements, the application manager server 1 receives, from the selected connectivity provider, an acknowledgement that the destination secure element 8 has received the secure element message. Subsequently, an acknowledgement that the destination secure element 8 has received the secure element message is sent to the application server 3.

Figure 8:
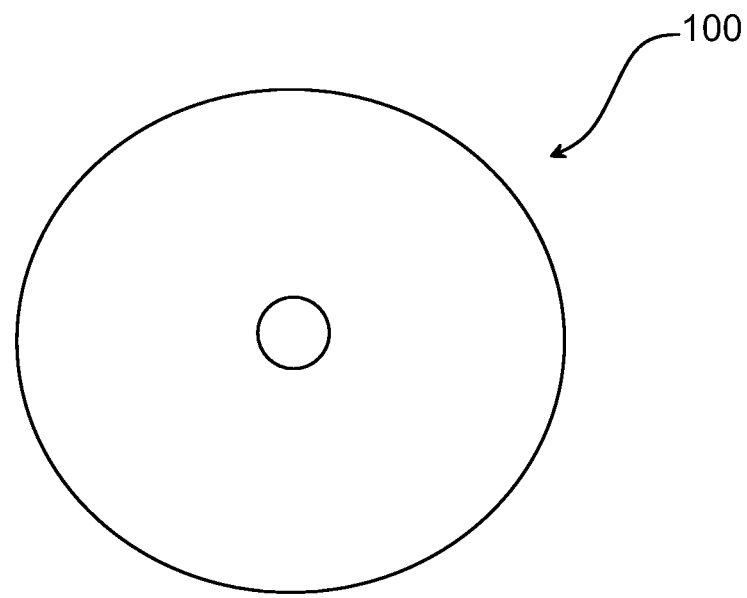
FIG. 8 shows one example of a computer program product comprising computer readable means.

FIG. 8 shows one example of a computer program product comprising computer readable means 100. On this computer readable means 100 a computer program can be stored, which computer program can cause a computer to execute the method according to embodiments described herein. In this example, the computer program product is an optical disc, such as a CD (compact disc) or a DVD (digital versatile disc). The computer readable means can also be solid state memory, such as flash memory or a software package distributed over a network, such as the Internet.

Figure 9:
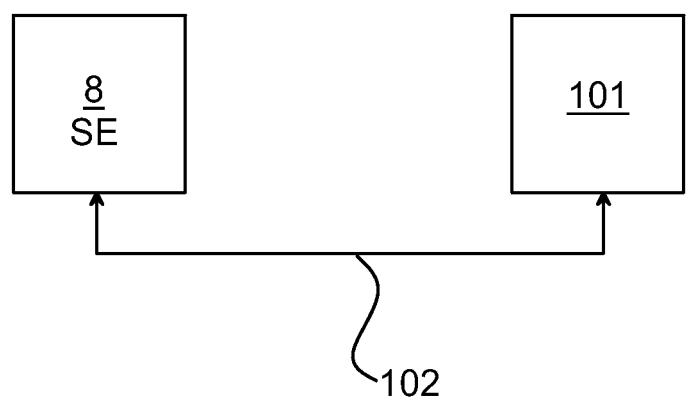
FIG. 9 is a schematic diagram illustrating communication with the secure element of FIG. 1.

FIG. 9 illustrates a secure element 8 environment. A secure element 8 is essentially a secure memory, with or without the attached possibility of secure execution. A secure memory is a storage device where write and/or read operations are authenticated. A secure execution environment is a method of executing applications in a way so that they are securely separated. Often there is also integrated support from the secure execution environment to access parts of a attached secure memory, allocated for the application in question. Examples of secure elements 8 are, but not limited to, secure elements conforming to global platform specifications, TPM/MTM modules conforming to TCG specifications and ARM TrustZone enabled CPUs with or without attached secure memory. The secure element can be a separate memory or a logical memory space within a physical memory also used for other purposes.

Typically there is also a need for communication with the secure element 8. This communication can be done with an application running in the secure execution environment of the secure element 8 and/or with the secure memory directly. An example of such a communication protocol 102 is, but not limited to, APDU based protocols defined in ISO 7816. Such communication is typically performed using a connecting device 101.

The invention makes it possible to decouple the low level secure element signalling from the trusted service manager, in this case the application manager server 1. It also provides the possibility for data transferred to be verified/signed by a third party, such as the secure element manager 4. This enables a multitude of new trust models which can greatly benefit the application manager server 1 in its role as a broker between secure element connectivity providers 5 and application servers 3 of service providers. It also makes it possible for an application server 3 of a service provider to have a direct, real-time, non application specific, interface to its application and/or security domain on the secure element 8. This gives the service provider the same type of interface towards the secure element 8 that it today already has when the secure element 8 is in physical contact with the Service Providers system. This enables the service provider to reuse existing protocols for communicating with the secure element 8 when using the TSM.

Whenever the term server is used herein, any suitable computer capable of performing the tasks as described can be used. For example, computers running operating systems such as Linux, MS Windows, Apple Mac OS, UNIX variants, etc. can be used. Any server contains a processor (e.g. a CPU), primary memory, such a RAM and has access to persistent storage, such as magnetic storage, solid state storage, optical storage or any combination of these.

The invention has mainly been described above with reference to a few embodiments. However, as is readily appreciated by a person skilled in the art, other embodiments than the ones disclosed above are equally possible within the scope of the invention.

The invention claimed is:

1. A method for sending a message to a secure element connected to a mobile equipment, wherein the secure element is associated with a user of the mobile equipment, the method being performed in an application manager server and comprising:
   receiving, by the application manager server from an application server, an application message and an identifier of a destination secure element;
   generating, by the application manager server, a secure element message from the application message;
   sending, by the application manager server, the secure element message to a secure element manager server which is different from the application server and the mobile equipment;
   receiving, by the application manager server from the secure element manager server, a signature of the secure element message;
   from a plurality of connectivity providers, selecting, by the application manager server, a connectivity provider capable of communicating with the destination secure element;
   sending, by the application manager server, the secure element message, including the signature, to the selected connectivity provider for forwarding to the destination secure element over a real-time communication channel;
   receiving, by the application manager server, a response to the secure element message from the selected connectivity provider, wherein the response is sent from the destination secure element using the real-time communication channel; and
   sending, by the application manager server, the response to the application server;
   wherein the plurality of connectivity providers are separate from the mobile equipment and are also separate from the application manager server.

2. The method of claim 1, wherein said response to the secure element message received from the selected connectivity provider acknowledges that the destination secure element has received the secure element message.

3. The method of claim 1, wherein generating the secure element message comprises using the application message as the secure element message.

4. The method of claim 1, further comprising:
   setting up, by the application manager server, a secure channel to the secure element;
   wherein sending the secure element message, by the application manager server, for forwarding to the destination secure element comprises sending the secure element message over the secure channel.

5. The method of claim 1, wherein the signature is appended to the secure element message.

6. The method of claim 1, further comprising, prior to sending the secure element message to the secure element manager server:
   from a plurality of secure element manager servers, selecting, by the application manager server, a secure element manager server which is associated with the destination secure element;
   wherein sending the secure element message, by the application manager server, to the secure element manager server comprises sending the secure element message to the selected secure element manager server.

7. The method of claim 1, wherein several secure element messages to be signed are sent collectively and corresponding signatures are received collectively.

8. An application manager server for sending messages to a secure element connected to a mobile equipment, wherein the secure element is associated with a user of the mobile equipment, the application manager server comprising hardware circuitry configured as:
- a receiver of the application manager server configured to receive, from an application server, an application message and an identifier of a destination secure element;
- a controller of the application manager server configured to generate a secure element message from the application message;
- a secure element manager interface of the application manager server configured to:
  - send the secure element message to a secure element manager server which is different from the application server and the mobile equipment; and
  - receive, from the secure element manager server, a signature of the secure element message;
- a connection selector of the application manager server configured to select, from a plurality of connectivity providers, a connectivity provider capable of communicating with the destination secure element; and
- a sender of the application manager server configured to send the secure element message, including the signature, to the selected connectivity provider for forwarding to the destination secure element over a real-time communication channel;
- wherein the receiver is further configured to receive a response to the secure element message from the selected connectivity provider, wherein the response is sent from the destination secure element using the real-time communication channel;
- wherein the sender is further configured to send the response to the application server; and
- wherein the plurality of connectivity providers are separate from the mobile equipment and are also separate from the application manager server.

9. The application manager server of claim 8, wherein the connection selector is configured to select a second application manager server that is capable of communicating with the destination secure element.

10. The application manager server of claim 8, wherein said response to the secure element message received from the selected connectivity provider includes an acknowledgement that the destination secure element has received the secure element message.

11. The application manager server of claim 8, wherein the hardware circuitry of the application manager server is further configured as a secure element manager server selector configured to select, from a plurality of secure element manager servers, the secure element manager server which is associated with the destination secure element.

12. A computer program product stored in non-transitory computer-readable media, said computer program product comprising program instructions for sending a message to a secure element connected to a mobile equipment, wherein the secure element is associated with a user of the mobile equipment, the computer program product comprising computer program code which, when run on an application manager server, configures the application manager server to:
- receive, by the application manager server from an application server, an application message and an identifier of a destination secure element;
- generate, by the application manager server, a secure element message from the application message;
- send, by the application manager server, the secure element message to a secure element manager server which is different from the application server and the mobile equipment;
- receive, by the application manager server from the secure element manager server, a signature of the secure element message;
- from a plurality of connectivity providers, select, by the application manager server, a connectivity provider capable of communicating with the destination secure element;
- send, by the application manager server, the secure element message, including the signature, to the selected connectivity provider for forwarding to the destination secure element over a real-time communication channel;
- receive, by the application manager server, a response to the secure element message from the selected connectivity provider, wherein the response is sent from the destination secure element using the real-time communication channel; and
- send, by the application manager server, the response to the application server;
- wherein the plurality of connectivity providers are separate from the mobile equipment and are also separate from the application manager server.

* * * * *